(12) United States Patent
Norris

(10) Patent No.: US 10,905,267 B2
(45) Date of Patent: Feb. 2, 2021

(54) CONVERTIBLE PLATE

(71) Applicant: Desiree Norris, Miramar, FL (US)

(72) Inventor: Desiree Norris, Miramar, FL (US)

( * ) Notice: Subject to any disclaimer, the term of this patent is extended or adjusted under 35 U.S.C. 154(b) by 857 days.

(21) Appl. No.: 15/376,181

(22) Filed: Dec. 12, 2016

(65) Prior Publication Data
US 2017/0086609 A1    Mar. 30, 2017

Related U.S. Application Data

(63) Continuation-in-part of application No. 13/946,754, filed on Jul. 19, 2013, now abandoned.

(51) Int. Cl.
*A47G 19/02* (2006.01)
*F21V 35/00* (2006.01)
*F21V 33/00* (2006.01)

(52) U.S. Cl.
CPC .......... *A47G 19/02* (2013.01); *F21V 33/0036* (2013.01); *F21V 35/00* (2013.01); *Y02W 30/82* (2015.05)

(58) Field of Classification Search
CPC .. A47G 19/065; A47G 19/10; A47G 23/0316; A47G 23/03; A47G 19/08; A47G 19/2255; F21V 35/00; B65D 1/34
USPC ....................... 16/73; 206/514, 217; 220/574
See application file for complete search history.

(56) References Cited

U.S. PATENT DOCUMENTS

| | | | | |
|---|---|---|---|---|
| 5,014,865 A | * | 5/1991 | Sauber | A47G 19/2255 215/377 |
| 5,058,737 A | * | 10/1991 | Patterson | A47G 19/065 206/217 |
| 5,176,283 A | * | 1/1993 | Patterson | A47G 19/06 206/217 |
| 5,240,136 A | * | 8/1993 | Patterson | A47G 19/065 206/217 |
| 8,550,014 B1 | * | 10/2013 | Mariani | A47G 19/00 108/150 |
| 2008/0257895 A1 | * | 10/2008 | Broselow | A47G 19/065 220/574 |
| 2010/0104994 A1 | * | 4/2010 | Fuqua | F21S 13/10 431/297 |
| 2012/0205331 A1 | * | 8/2012 | Stejskal | F21V 35/00 211/60.1 |
| 2016/0120342 A1 | * | 5/2016 | Petersburg | A47G 19/065 220/574 |

* cited by examiner

*Primary Examiner* — Anthony D Stashick
*Assistant Examiner* — Raven Collins
(74) *Attorney, Agent, or Firm* — Juneau & Mitchell; Todd L. Juneau

(57) ABSTRACT

The invention relates to a convertible plate having a pedestal collar with a flange defining an interior channel for detachably securing a pedestal to the bottom of the plate, wherein detachably mounting the convertible plate on the pedestal forms a display assembly, and methods of doing the same.

9 Claims, 13 Drawing Sheets

FIGURE 15
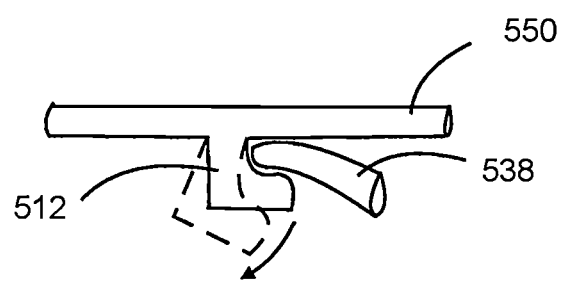
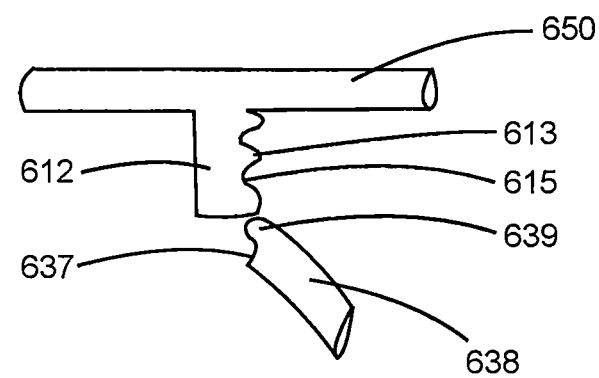
FIGURE 16

CONVERTIBLE PLATE

BACKGROUND OF THE INVENTION

Field of the Invention

The invention relates to a convertible plate having a pedestal collar with a flange defining an interior channel for detachably securing a pedestal to the bottom of the plate, wherein detachably mounting the convertible plate on the pedestal forms a display assembly, and methods of doing the same.

Candle holders provide a means of holding a candle in place during events, such as dinner parties and formal dinners. However, the unique designs and features of candle holders are rather limited in that candle holders are utilized in very limited circumstances. Similarly true dessert plates are typically placed on a table or credenza to display various desserts and treats. However, the dessert platter is typically set on the surface of the table or elevated on boxes or pedestals. Each of the individual aforementioned items are classically utilized in unique, but separate circumstances.

SUMMARY OF THE INVENTION

In one preferred embodiment, there is provided a convertible plate comprising: (i) a plate having a bottom portion, the bottom portion having a central pedestal seat area and a peripheral rim area; (ii) a pedestal collar on the central pedestal seat area of the bottom portion of the plate, the pedestal collar comprising at least one collar arm defining a receiving aperture and encompassing the central pedestal seat area on the bottom portion; and (iii) a flange on the pedestal collar, the flange defining an interior channel adjacent the bottom of the convertible plate for securing a lip portion of a pedestal; wherein detachably mounting the convertible plate on the pedestal forms a display assembly.

In a preferred embodiment, there is also provided a convertible plate, wherein the pedestal collar comprises a configuration selected from (i) a U-shaped configuration and (ii) a circular configuration, the U-shaped configuration comprising a curved catch portion that connects proximal ends of a first collar arm and a second collar arm, the first and second collar arms defining a receiving aperture opposite the curved catch portion, and a flared guide and a bias element is attached to each distal end of the first and second collar arms for receiving and securing the lip portion of the pedestal, and, the circular configuration comprising a continuous band, the continuous band selected from a flexible band and a rigid band, the flange of the flexible band is deformable to receive the lip portion of the pedestal, and the flange of the rigid band having grooves and threading to receive the lip portion of the pedestal.

In a preferred embodiment, there is also provided a convertible plate, wherein the convertible plate has a perimeter shape that is selected from round, oval, square, rectangular, triangular, regular polyhedron, and irregular polyhedron.

In a preferred embodiment, there is also provided a convertible plate, wherein the convertible plate comprises a footer, and wherein the pedestal collar is lower in height from the bottom of the plate than the footer.

In a preferred embodiment, there is also provided a convertible plate, wherein the plate is selected from earthenware, stoneware, porcelain, bone china, glass, melamine, ceramic, steel, stainless steel, iron, copper, aluminum, acrylic, styrene, polypropylene, acrylic blend, polycarbonate, tritan, wood, silicone, metal, and combination thereof.

In a preferred embodiment, there is also provided a convertible plate wherein the plate and the collar are different materials.

In a preferred embodiment, there is also provided a method of converting a plate to a display platter, the steps comprising: (i) providing a convertible plate as described herein; and (ii) detachably mounting a pedestal having a lip portion into the pedestal collar of the central pedestal seat area of the bottom portion of the plate; wherein the lip portion of the pedestal is received into the interior channel that is defined by the flange adjacent to the bottom of the convertible plate.

In a preferred embodiment, there is also provided a method as described herein, wherein the pedestal collar comprises a configuration selected from (i) a U-shaped configuration and (ii) a circular configuration, the U-shaped configuration comprising a curved catch portion that connects proximal ends of a first collar arm and a second collar arm, the first and second collar arms defining a receiving aperture opposite the curved catch portion, and a flared guide and a bias element is attached to each distal end of the first and second collar arms for receiving and securing the lip portion of the pedestal, and, the circular configuration comprising a continuous band, the continuous band selected from a flexible band and a rigid band, the flange of the flexible band is deformable to receive the lip portion of the pedestal, and the flange of the rigid band having grooves and threading to receive the lip portion of the pedestal.

In a preferred embodiment, there is also provided a combination dessert plate comprising: a plate having a bottom portion; a seal disposed upon said bottom portion comprising at least one inner edge and an outer edge; and a candle holder, wherein a portion of said candle holder is positioned adjacent at least one inner edge and wherein said seal is capable of releasably engaging said candle holder when said plate is disposed thereon.

In one example embodiment, a combination dessert plate includes a plate having a bottom portion and a seal disposed upon said bottom portion comprising at least one inner edge and an outer edge. The plate assembly further includes a candle holder, wherein a portion of said candle holder is positioned adjacent at least one inner edge and wherein said seal is capable of releasably engaging said candle holder when said plate is disposed thereon.

In another example embodiment, a method of using a bias lock mechanism is disclosed that includes the steps of disposing a candle holder on a surface, wherein said candle holder having a top edge that includes a portion for receiving a candle. The method further includes the step of positioning a plate over said candle holder, wherein said plate having a bottom portion with a seal attached thereon, wherein said seal having an inner edge and an outer edge, and disposing said plate on said top edge of said candle holder.

BRIEF DESCRIPTION OF THE DRAWINGS

The invention will be further explained with reference to the appended Figures, wherein like structure is referred to by like numerals through the several views.

FIG. 15 illustrates in a cross-section view an example of an embodiment of a convertible plate having a deformable attachment mechanism.

FIG. 16 illustrates in a cross-section view an example of an embodiment of a convertible plate having a grooved or threaded attachment mechanism.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Combining the two items you have a candle holder that transforms into a base for a dessert plate. The plate may be generally placed on the top portion of a candle holder.

The pedestal collar may be made from the same material as the plate. For example, the plate may be made from earthenware, stoneware, porcelain, bone china, glass, melamine, ceramic, steel, stainless steel, iron, copper, aluminum, acrylic, styrene, polypropylene, acrylic blend, polycarbonate, tritan, wood, silicone, metal, and combinations thereof.

The term "deformable" means being easily shaped or molded. Deformable metal refers to reversible plastic deformation, especially a malleable deformation where the material can be bent, formed or shaped without cracking or bending, and where when a, e.g. bending, force is applied, the material does not elastically return to its former shape, but retains the shape it is given.

The term "elastic" means being easily shaped or molded, but where the material elastically returns to its prior shape.

The term "polymer" means polycarbonates, nylon, polyurethanes, polyesters, low density polyethylenes, high density polyethylenes, polypropylenes, polystyrenes, polyvinyl chlorides, polychlorotrifluoroethylenes, natural rubbers, synthetic rubbers such as neoprene and butadiene rubbers, silicones (polysiloxanes), block co-polymers, composite polymers and impregnated polymers, e.g. silnylon. Polymers are materials that can coat, can bend and deform, resists cracking, resists degrading, powdering, or peeling, resists migrating, resists sticking to external surfaces, provides tackiness or grip texture, among other properties. Tackiness can be defined as having a low glass transition temperature, including gtt from 15-45 degrees Celsius. Examples of tacky materials include natural rubbers, synthetic rubbers including acrylonitrile butadiene "nitrile rubber", nylon, and polymers based on vinyl methyl ether, vinyl ethyl ether, and vinyl isobutyl ether. Such polymers may be formulated with cellulose nitrate, chlorinated binders, styrene copolymers, and similar materials useful for surface coatings.

Where a collar requires a stiffer material and uses a spring bias, a stiffer material or composite is necessarily used to make the collar and/or the plate. Where a collar requires a bendable material and uses a deformation or elastic mechanism, an elastic or deformable material or composite is necessarily used to make the collar and/or the plate.

Figure 1:
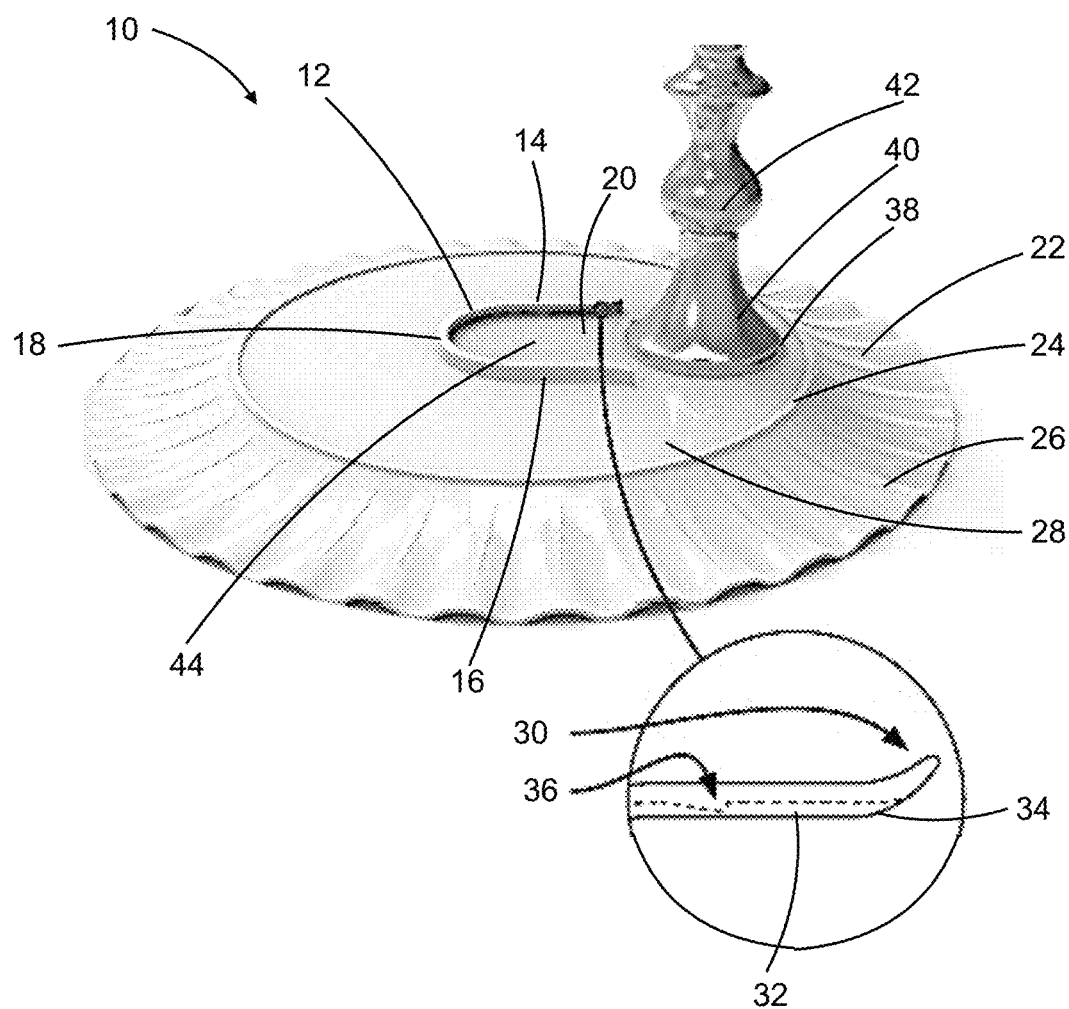
FIG. 1 illustrates a bottom perspective view of a convertible plate assembly.

FIG. 1 illustrates a bottom perspective view of an embodiment of a convertible plate assembly. Convertible plate 10 has pedestal collar 12 positioned in the center area of plate bottom 28. Pedestal collar 12 has first collar arm 14 and second collar arm 16 connected by catch 18 and defining receiving aperture 20. Plate 22 has rim 26, footer 24, and bottom 28. Each collar arm 14, 16 has flared guide 30 and flange 32.

In operation, flange 32 defines channel 34 of pedestal collar 12 for receiving lip 38 of the bell 40 of pedestal 42 into each collar arm 14, 16. Notch 36 operates as a biasing element to secure bell 40 into pedestal seat 44 after the bell 40 is slid into receiving aperture 20 of pedestal collar 12.

Figure 2:
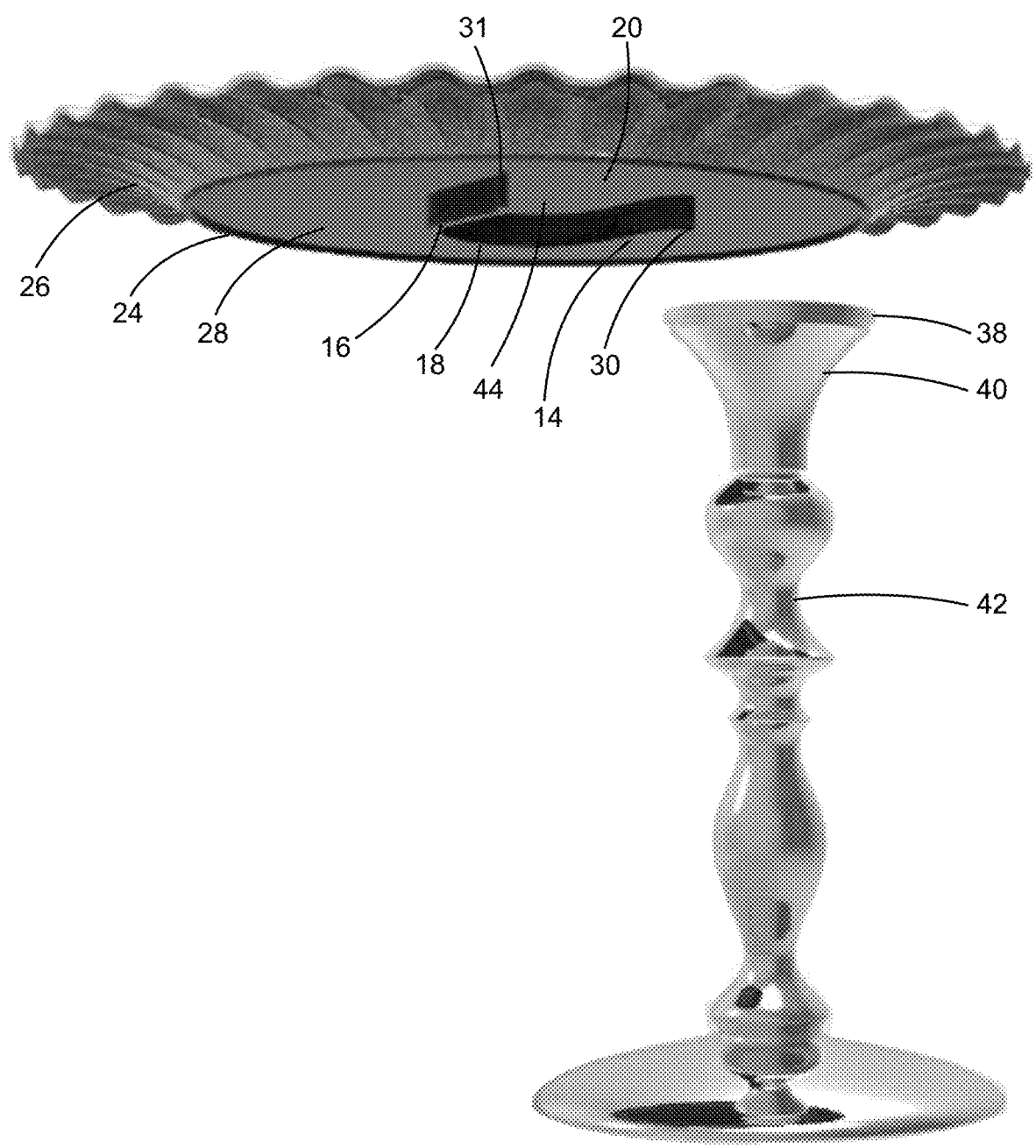
FIG. 2 describes a side perspective view of a convertible plate/candle holder assembly.

FIG. 2 describes a side perspective view of a convertible plate 10/candle holder assembly. FIG. 2 shows pedestal collar attached to the plate bottom 28. Pedestal collar has first collar arm 14 with flared guide 30, and second collar arm 16 with flared guide 31. The collar arms 14, 16 define the receiving aperture 20, and together with catch 18, form the perimeter of the pedestal seat 44. Pedestal 42 has bell 40 and lip 38, which operatively engages the collar arms 14, 16 at the aperture 20 so the bell 40 of pedestal 42 slides into the seat 44, transforming the convertible plate into a display platform.

Figure 3:
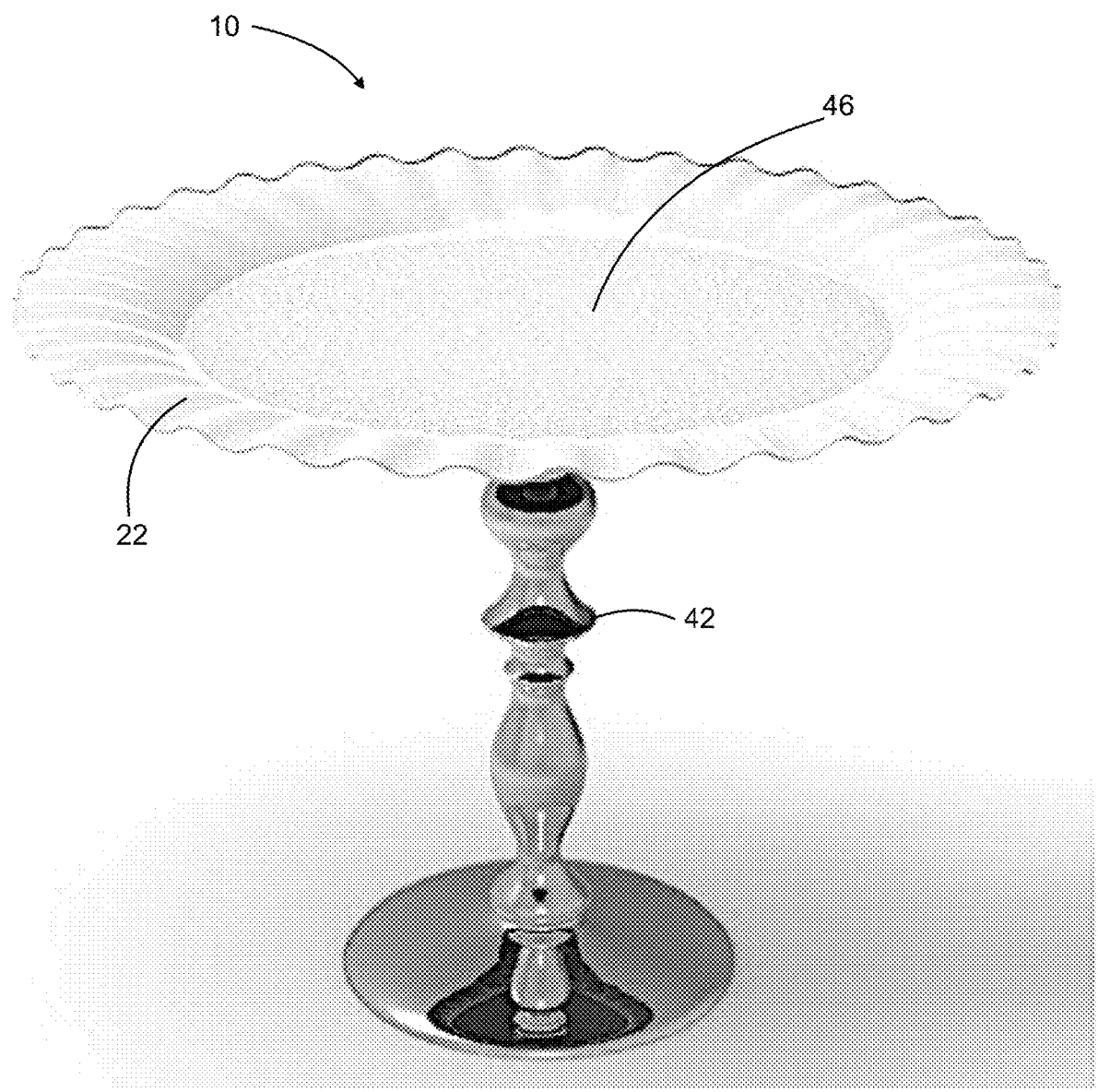
FIG. 3 describes a top view of a convertible plate mounted on a base.

FIG. 3 describes a top view of a convertible plate mounted on a base. When assembled, the convertible plate 10 with plate 22 and pedestal 42 form a display platform suitable for displaying and presenting food items and/or decorative items.

Figure 4:
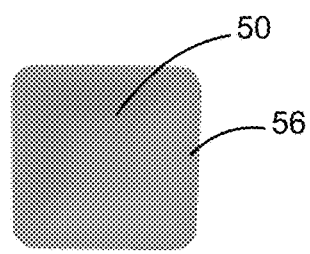
FIG. 4 describes a top view of a square embodiment of a convertible plate.

FIG. 4 describes a top view of a square embodiment of a convertible plate. FIG. 4 shows plate top 50 and plate rim 56.

Figure 5:
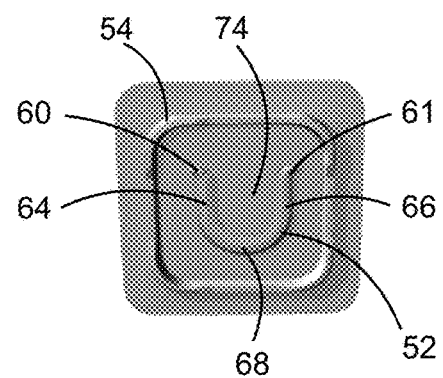
FIG. 5 describes a bottom view of a square embodiment of a convertible plate.

FIG. 5 describes a bottom view of a square embodiment of a convertible plate. FIG. 5 shows collar 52 within the perimeter of the footer 54. Collar 52 is shown having flare segments 60, 61 at the terminus of collar arm 64 and 66. Catch 68 connects the collar arms 64, 66 and defines the seat area 74.

Figure 6:
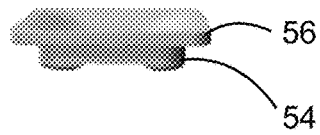
FIG. 6 describes a side or plan view of a square embodiment of a convertible plate.

FIG. 6 describes a side or plan view of a square embodiment of a convertible plate. FIG. 6 shows rim 56 and footer 54.

Figure 7:
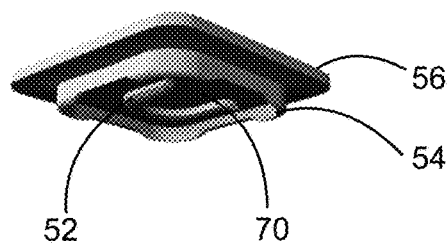
FIG. 7 describes a side perspective view of a square embodiment of a convertible plate.

FIG. 7 describes a side perspective view of a square embodiment of a convertible plate. FIG. 7 shows rim 56, with footer 54 encompassing collar 52. Receiving aperture 70 is seen in this view.

Figure 8:
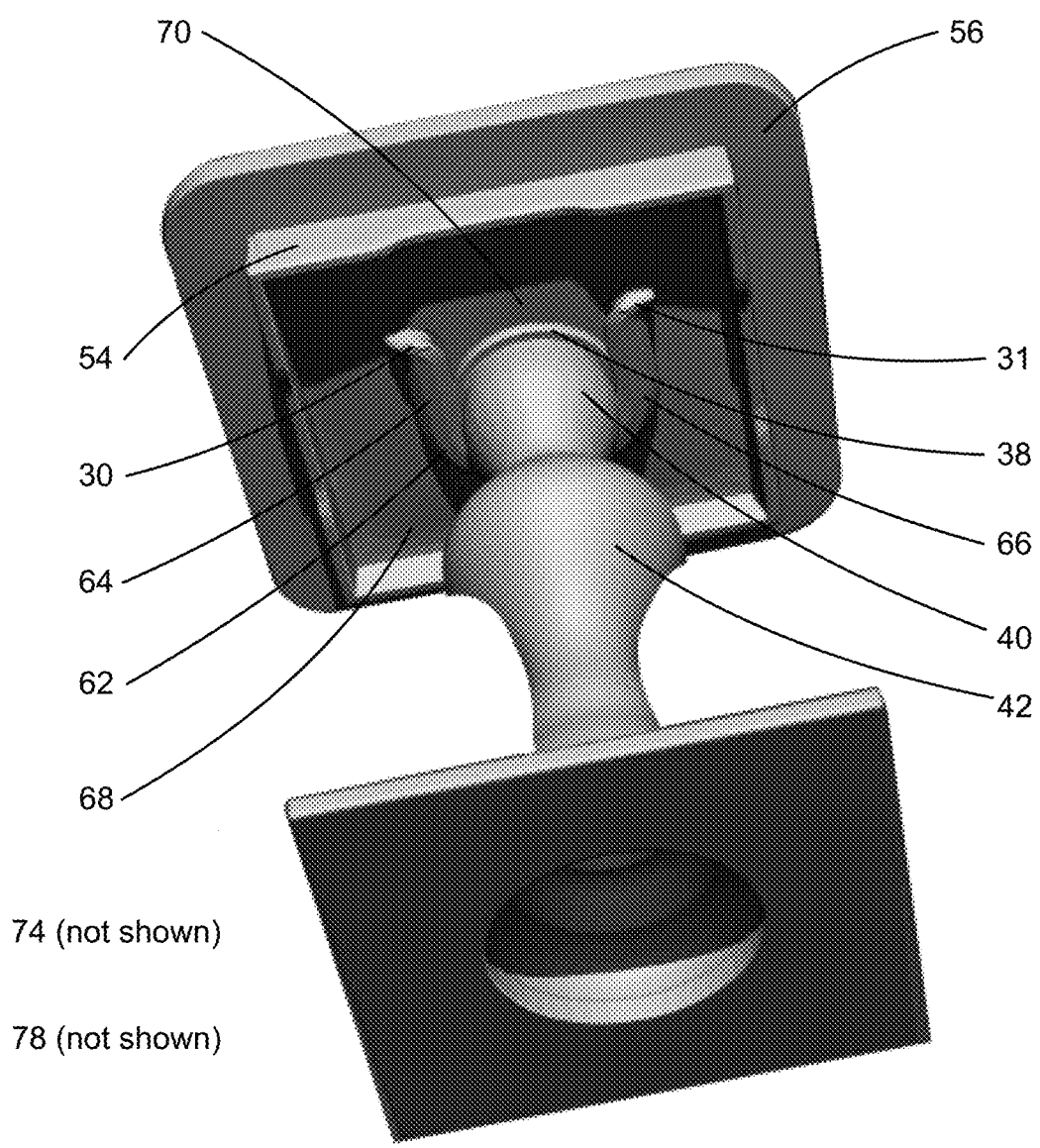
FIG. 8 illustrates a perspective from below view of a square embodiment of a convertible plate mounted on a base.

FIG. 8 illustrates a perspective from below view of a square embodiment of a convertible plate mounted on a base. FIG. 8 shows pedestal collar 62 attached to the plate bottom 68. Pedestal collar 62 has first collar arm 64 with flared guide 30, and second collar arm 66 with flared guide 31. The collar arms 64, 66 define the receiving aperture 70, and together with catch 78 (not shown), form the perimeter of the pedestal seat 74 (not visible). Pedestal 42 has bell 40 and lip 38, which operatively engages the collar arms 64, 66 at the aperture 70 so the bell 40 of pedestal 42 slides into the seat 74, transforming the convertible plate into a display platform.

In a preferred embodiment, lip 38 slides into a flange and channel structure as in FIG. 1. The pedestals/bases do not require any specific shape of lip 38. Lip 38 can be a mere extension of bell 40 that engages with flange and channel, or lip 38 can be an extended feature. Flange may made of rigid material or may be made of flexible material. The collar arms and flange may be of the same or of different materials. Flange provides an axial bias (in the direction of the standing height of the pedestal) to engage and secure the lip of the bell of the base/pedestal.

Another bias feature include the notch 36 as seen in FIG. 1 (not visible in FIG. 8). The notch may be a simple bead or may be an angular narrowing segment to create a lateral bias against the lip of the bell.

Figure 9:
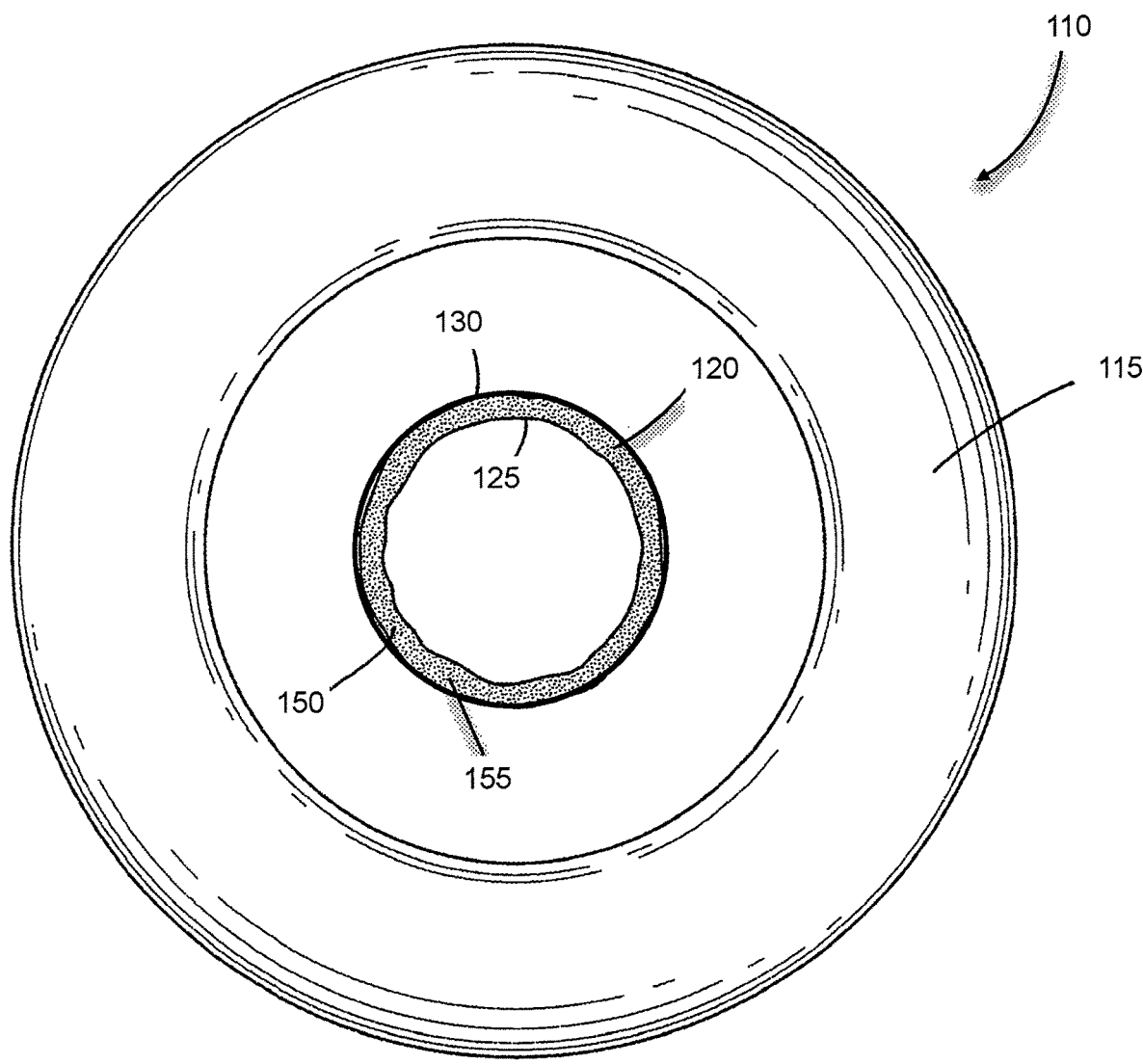
FIG. 9 illustrates a bottom view of a circular embodiment of a convertible plate.
Figure 10:
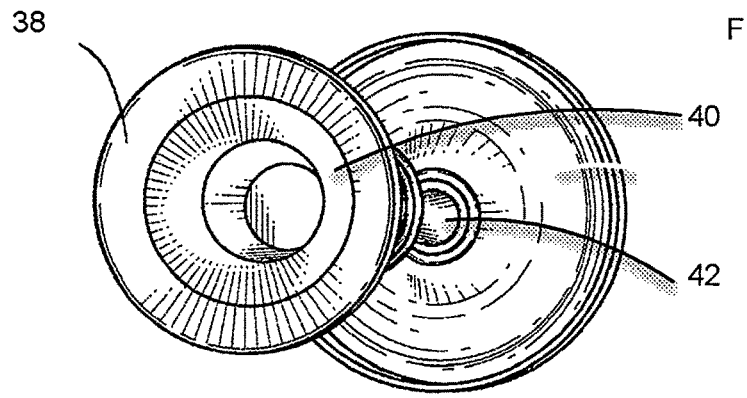
FIG. 10 shows an example of a base for the convertible plate in the form of a candle holder.
Figure 11:
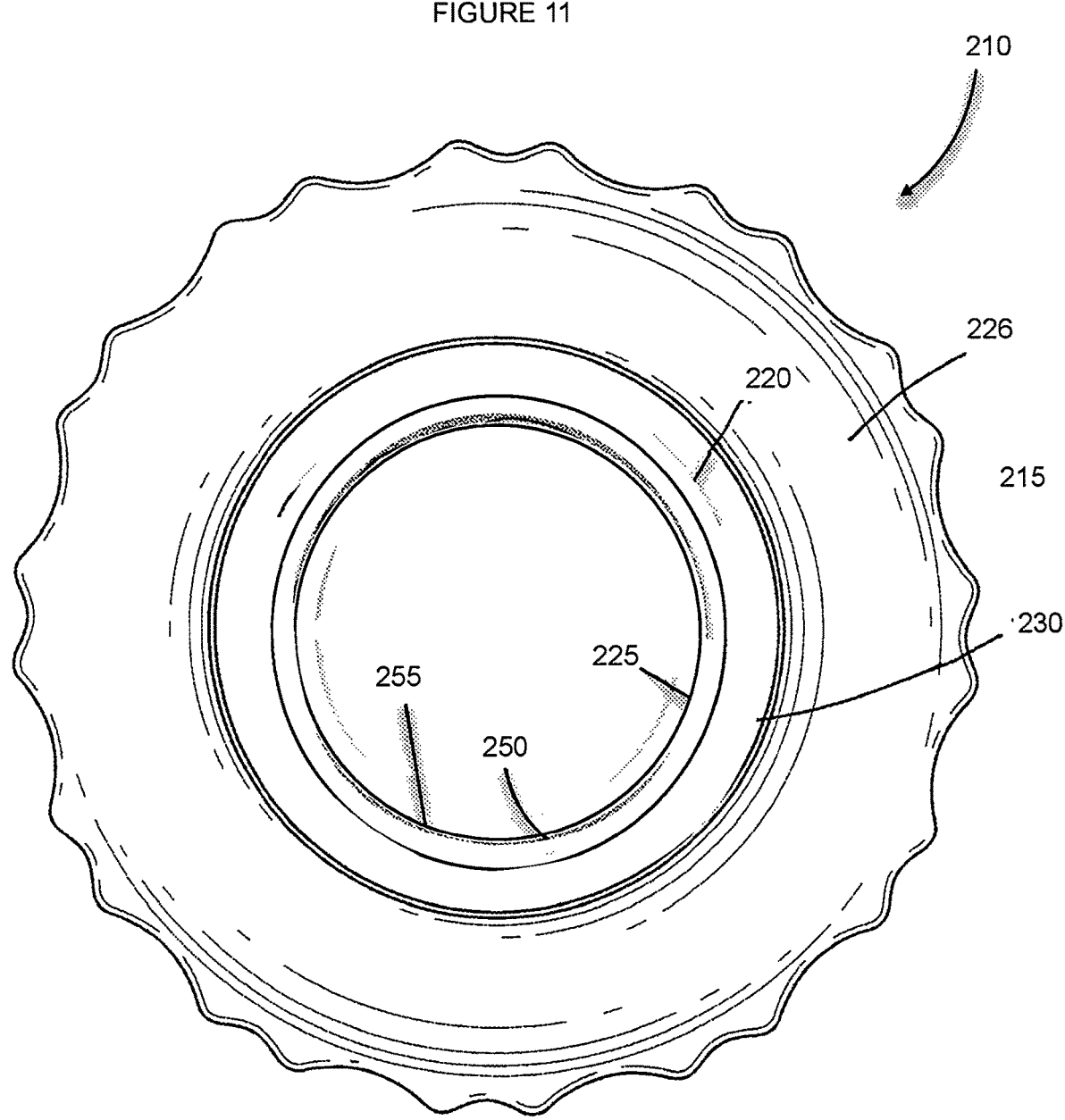
FIG. 11 illustrates a bottom view of a circular embodiment of a convertible plate having a larger attachment or sealing mechanism in relation to the size of the convertible plate.
Figure 12:
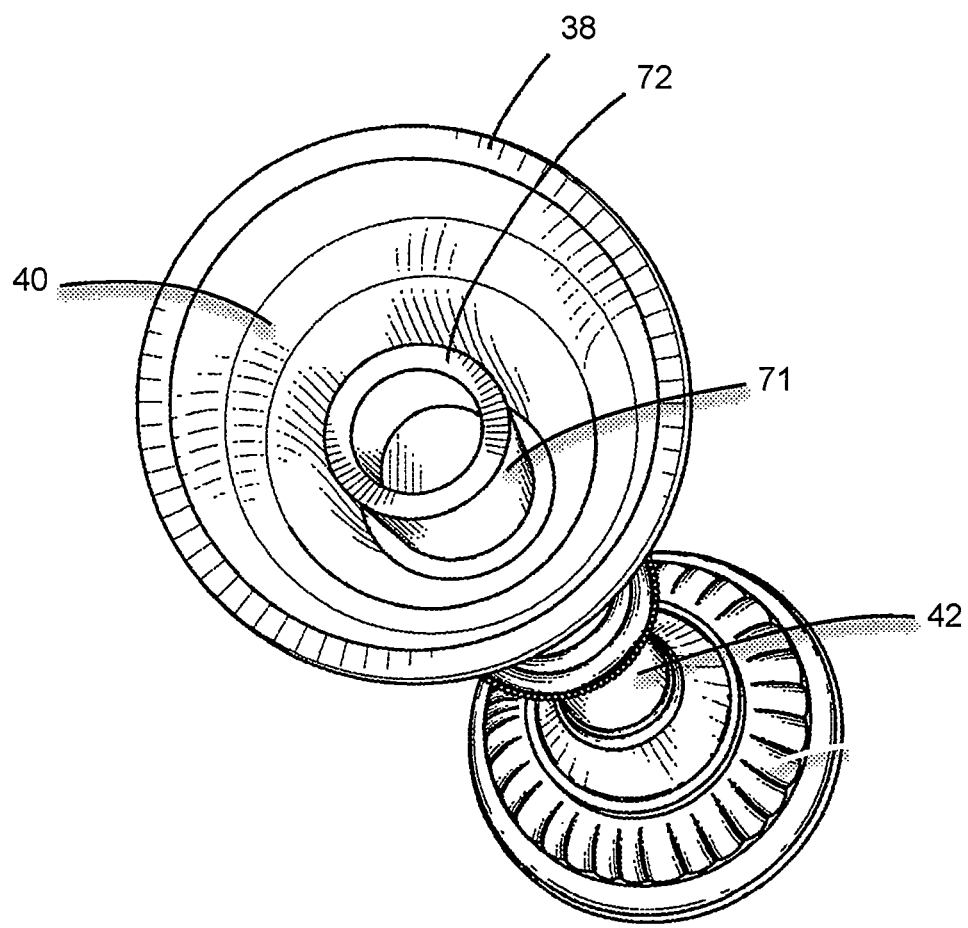
FIG. 12 shows another example of a base for the convertible plate in the form of a candle holder.

FIG. 9 illustrates a bottom view of a circular embodiment of a convertible plate 110 with rim 126. FIG. 10 shows an example of a base/pedestal 42 for the convertible plate 110 in the form of a candle holder. FIG. 11 illustrates a bottom view of a circular embodiment of a convertible plate 110 having a larger attachment or sealing mechanism in relation to the size of the convertible plate. FIG. 12 shows another example of a base 42 for the convertible plate 110 in the form of a candle holder.

Referring now to FIGS. 9 and 11, plate 10 generally includes a bottom portion 115, 215 and a seal 120, 220 disposed thereon. Seal 120, 220 may be made of a number of materials. In one example embodiment, as shown in FIG. 9 and FIG. 11, seal 120 and 220 is fashioned with an inner edge 125, 225 and an outer edge 130, 230. The inner edge may be in the form flange and channel, and the outer edge providing a structural portion of flange. Each of the aforementioned edges may have a regular edge or may have an irregular edge. Without being limited either way, the edges are shown with an irregular or non-symmetrical surface for emphasis but are intended to encompass both types, or even combinations of both regular and irregular within the same item.

In at least these example embodiments, the inner edge 125, 225 will provide securement to the candleholder. In an alternative related embodiment, the seal may include symmetrical edges. Although not wanting to be bound by any particular theory the bottom surface 150, 250 of seal 120, 220 will be generally level to prevent a serving dishing from rocking when placed on a surface.

It should be appreciated that seal(s) 120, 220 are integral with the plate bottom and/or are manufactured as a permanent feature disposed on bottom portion 115, 215. In an alternative embodiment, seal(s) 120, 220 may be configured as multiple elements, with a base element integrally part of the plate, with intermediate gaskets or multi-component attachment/securement devices removeably disposed on the base element of the bottom portion 115, 215.

Seal(s) 120, 220 is structured in a manner to allow the top outer edge 38 of candle holder bell 40, and the top inner edge 72 of candle holder 71 of pedestal 40, as shown in FIG. 10 and FIG. 12, to securely connect with bottom portion 115, 215 and inner edge 125, 225 of seal, as shown in FIG. 9 and FIG. 11. This functionality provides one with the ability to conveniently attach a plate to a candle holder for use to display and/or serve a variety of desserts, treats, and related foodstuffs.

Plate 110 and candle holder 40 are individually functional, but together they create new versatile piece, thereby expanding one's display capabilities for dinner parties, gatherings and the like. When in use candle holder 40 will be positioned in an upright manner to provide a base to attached plate 110 thereon. When plate 110 is positioned over candle holder 40, seal 120, 220 is removeably coupled to plate 110 to candle holder 40.

Although seal 120, 220 will be fairly rigid to provide a sufficient amount of securement to withstand the weight associated with a plate having foodstuffs thereon, the securement is not so robust as to require an excessive amount of force to remove plate 110 from candle holder 40 when the combination is no longer desired. The sealing mechanism 155, 255 could be a number of features, such as intrinsic material rigidity, a spring bias mechanism, or turn-knob locking mechanism. Another sealing mechanism 155, 255 for connecting the plate 110 to the candle holder 40 may comprise seal 120, 220 with a turn connector, similar to opening and closing a bottle or removing a gas cap.

Figure 13:
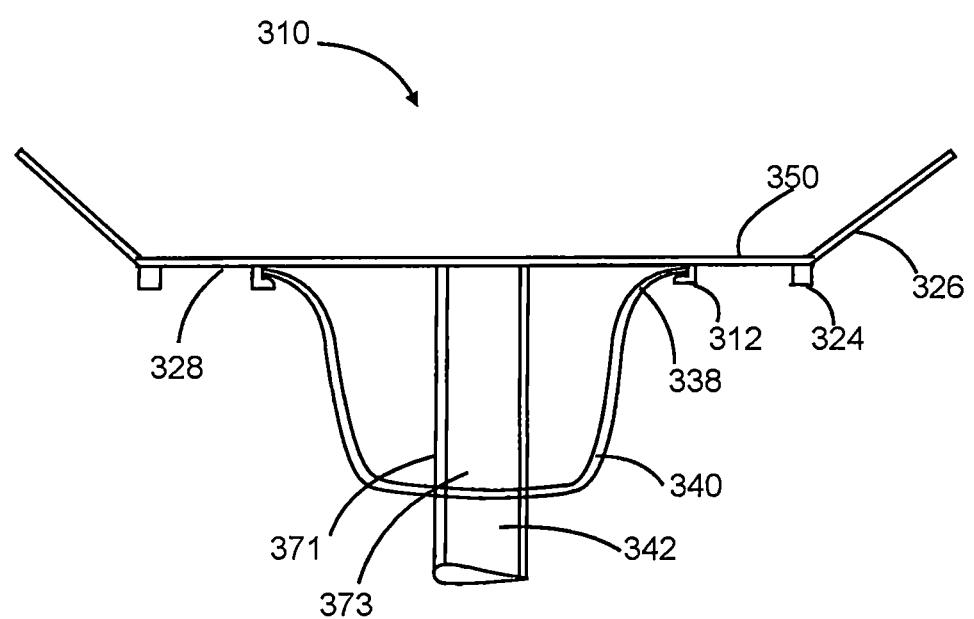
FIG. 13 shows a partial view of an other example of a base for the convertible plate in the form of a candle holder that extends to the bottom of the convertible plate.

FIG. 13 shows a partial cross-sectional view of an other example of a base for the convertible plate 310 in the form of a candle holder 371 that extends to the bottom 328 of the convertible plate 310. Plate rim 326 and plate top 350 are shown along with plate footer 324 and collar 312 in cross-section. Collar 312 is shown receiving lip 338 of bell 340 of the pedestal/base. Collar 312 may include a flange and channel securing mechanism. The pedestal has candle cavity 373 and candle holder 371, which extends completely up to the same level of plate bottom 328.

Figure 14:
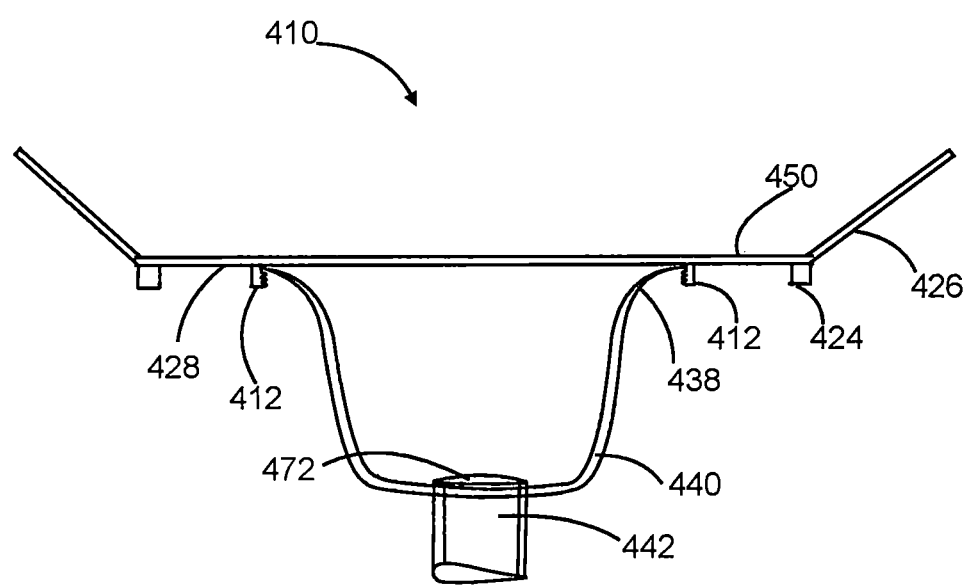
FIG. 14 shows a partial view of an other example of a base for the convertible plate in the form of a candle holder wherein only the bell makes contact with bottom of the convertible plate.

FIG. 14 shows a partial cross-sectional view of an other example of a base for the convertible plate 410 in the form of a candle holder 472 wherein only the bell 440 makes contact with bottom 428 of the convertible plate 410. Plate rim 426 and plate top 450 are shown along with plate footer 424 and collar 412 in cross-section. Collar 412 is shown receiving lip 438 of bell 440 of the pedestal/base 442. Collar 412 is shown having a screw-type threading in cross-section. Collar 412 has a downward post that may be perpendicular to the plate bottom 428. This can provide a biasing laterally in the direction of the center of the plate. Cooperative threading on collar 412 secures the lip of the bell in a vertical direction, parallel with the axis of the pedestal.

FIG. 15 illustrates in a cross-section view an example of an embodiment of a convertible plate 550 having an elastic or a deformable collar 512 attachment mechanism. Lip 538 of pedestal (not shown) is pushed against the elastic or deformable collar 512 until the collar moves laterally and expands the opening for the lip 538 of the pedestal to be received. In this embodiment, a circular attachment mechanism, such as in FIGS. 9 and 11, can be used to securely attach a pedestal to a convertible plate. Where the collar is elastic, the material has a natural bias and returns to its original shape to attachment and secure the pedestal. Where a collar is deformable, the user can bend the collar aside, position the pedestal, and then bend the collar back over the lip of the pedestal to attach and secure the pedestal to the plate.

FIG. 16 illustrates in a cross-section view an example of an embodiment of a convertible plate 650 having a grooved or threaded (screw-type) collar 612 attachment mechanism. Lip 638 of pedestal (not shown) is engaged with grooved or threaded collar 612 allowing the lip 638 of the pedestal to be received. In this embodiment, a circular attachment mechanism, such as in FIGS. 9 and 11, can be used to securely attach a pedestal to a convertible plate. FIG. 16 shows groove 615 and thread 613 on an inner surface of collar 612. Lip 638 is shown having bead 639 and shoulder 637 for engaging the threads of collar 612.

Figure 17:
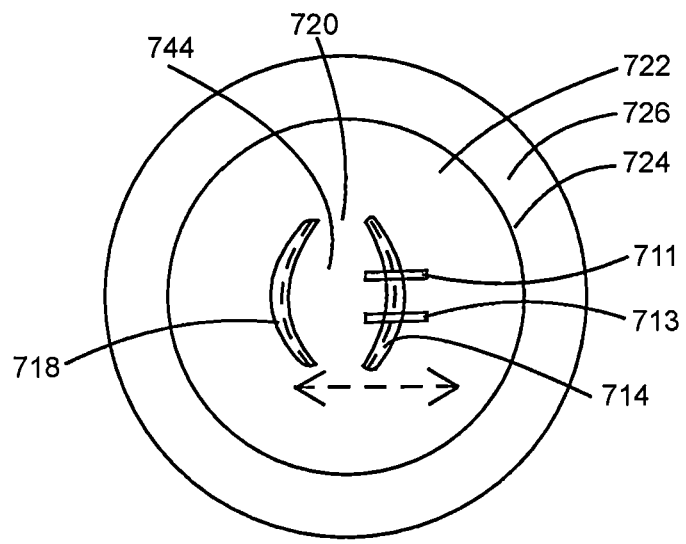
FIG. 17 illustrates in a bottom view an example of an embodiment of a convertible plate having a slidable or vise-type attachment mechanism.

FIG. 17 illustrates in a bottom view an example of an embodiment of a convertible plate having a slidable or vise-type collar attachment mechanism. Catch 718 is shown opposite slidable arm 714. Slidable arm 714 moves along tracks 711, 713 integrated into plate 722. Catch 718 and slidable arm 714 open to receive a pedestal through aperture 720. Slidable arm 714 is then moved laterally to close or narrow the aperture 720, which locks the pedestal into place in the pedestal seat 744. Catch 718 is shown having flange and channel (dotted line). Slidable arm 714 may also optionally have a flange and channel securement mechanism (dotted line).

Figure 18:
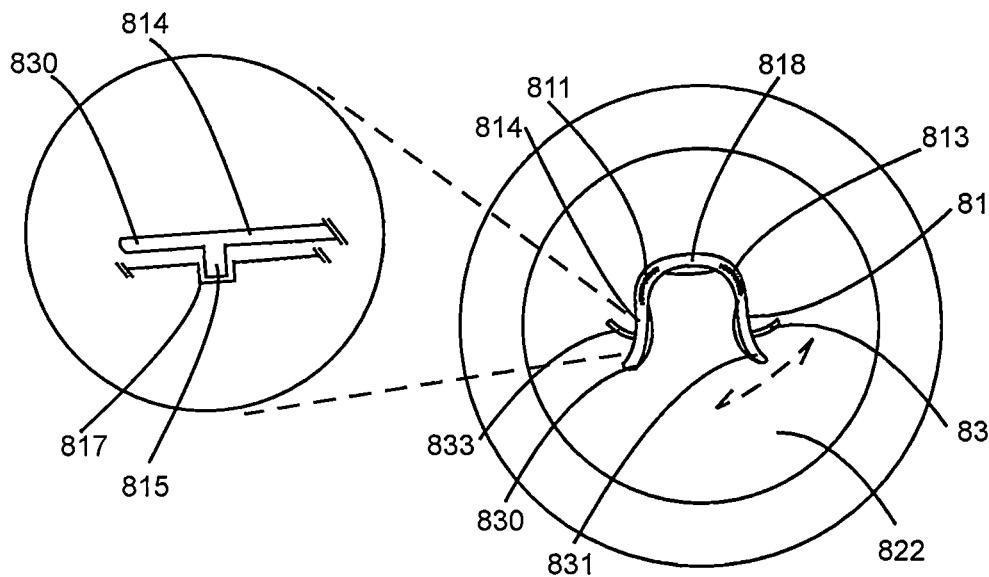
FIG. 18 illustrates in a bottom view an example of an embodiment of a convertible plate having one or more slidable attachment arms in a slidable arm attachment mechanism.

FIG. 18 illustrates in a bottom view an example of an embodiment of a convertible plate having one or more slidable attachment arms in a slidable arm attachment mechanism. Catch 818 is shown connecting two slidable arms 814, 816. Arm 814 has flexible portion 811 connecting moveable flange portion 830, and arm 816 has flexible portion 813 connecting moveable flange portion 831. Flange portions 833, 835 of arms 814, 816 move within integrated tracks 833, 835 in plate bottom 822. Detailed view shows flange 830 on arm 814 having bead 815 for moving within the groove 817 of track 831, 833.

Catch 818 is shown having flange and channel (bumped out line). Flexible arms 814, 816 may also optionally have a flange and channel securement mechanism (bumped out lines). Note that flange and channel may optionally extend fully around the circumference of the collar, including the flexible portions of the collar. Alternatively, the flange and channel may only extend partially along the inner surface of the collar.

Figure 19:
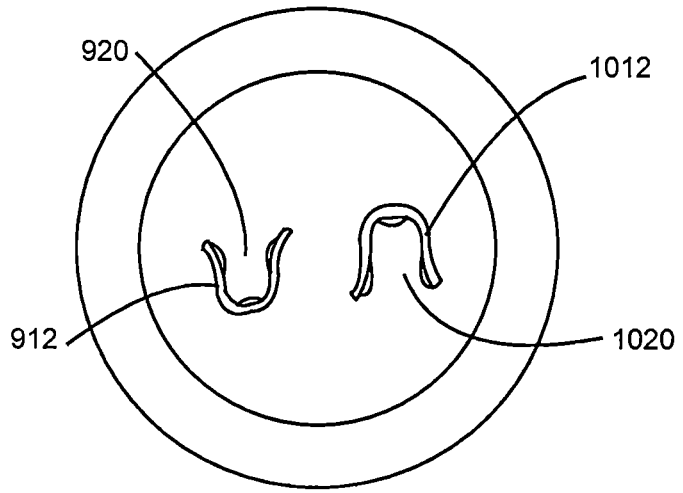
FIG. 19 illustrates in a bottom view an example of an embodiment of a convertible plate having a double-base attachment mechanism.

FIG. 19 illustrates in a bottom view an example of an embodiment of a convertible plate having a double-base collar attachment mechanism. Collar 912 and collar 1012 are shown are operated as previously described herein. Collars 912 and 11012 are shown having access apertures 920 and 1020 pointing in opposite directions. Catch is shown having optional flange and channel (bump out line). Collar arms may also optionally have a flange and channel securement mechanism (bump out line).

Figure 20:
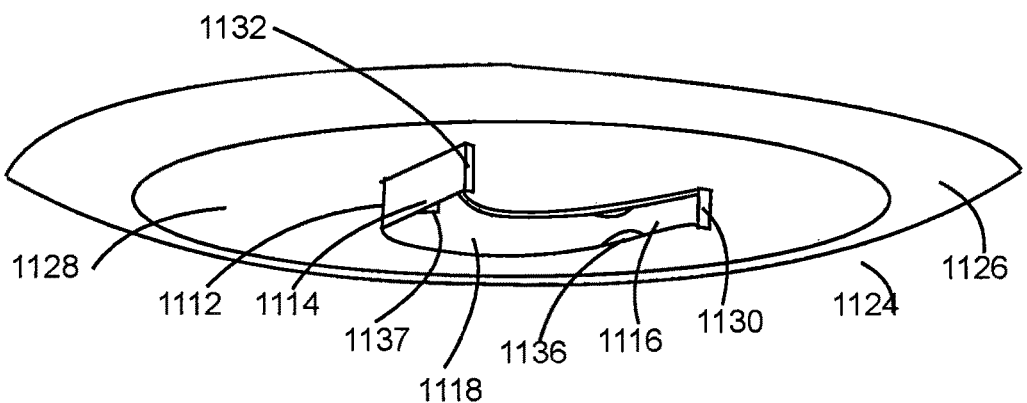
FIG. 20 illustrates a side perspective view of a convertible plate where the attachment mechanism extends beyond the height of the footer of the plate.

FIG. 20 illustrates a side perspective view of a convertible plate where the attachment mechanism extends beyond the height of the footer of the plate. Plate rim 1126 and plate footer 1124 define a perimeter that encompasses tall collar 1112. Tall collar 1112 is shown having a height from the plate bottom 1128 that is greater than the height of the plate footer 1124 from the bottom 1128. Arms 1114 and 1116 connected by catch 1118 form the tall collar 1112. Notch bias elements 1136, 1137 are shown on arms 1114, 1116 positioned between the catch 1118 and the flange 1130, 1132. Optional flange is shown along the top of the inner surface of the collar.

Figure 21:
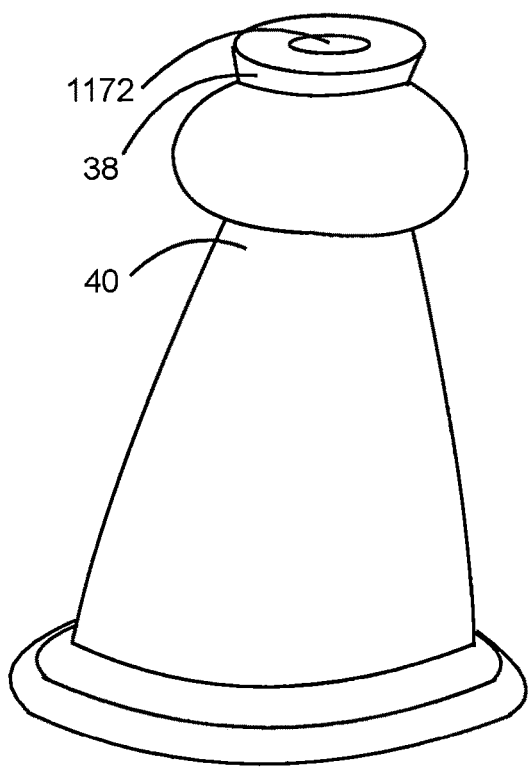
FIG. 21 shows another example of a decoration base for the convertible plate in the form of a candle holder.

FIG. 21 shows another example of a decoration base for the convertible plate in the form of a candle holder having pedestal 40 with bell 38 and lip 1172.

Figure 22:
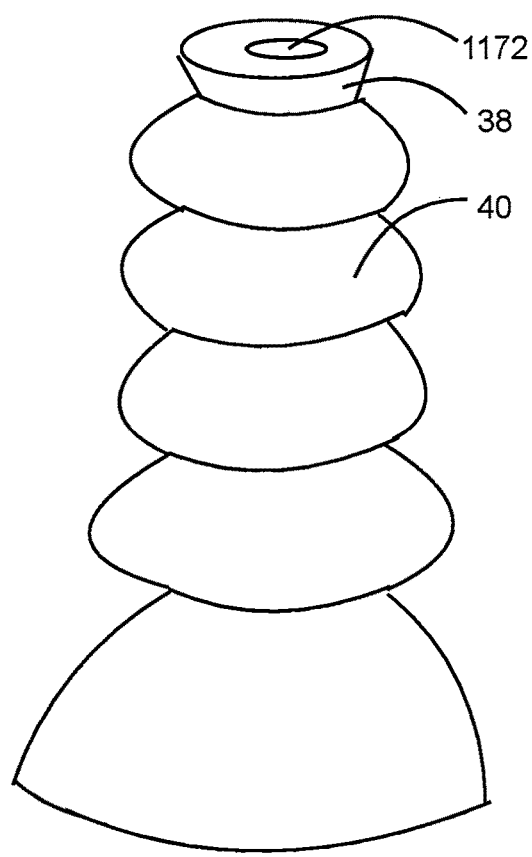
FIG. 22 shows another example of a decorative base for the convertible plate in the form of a candle holder.

FIG. 22 shows another example of a decorative base for the convertible plate in the form of a candle holder having pedestal 40 with bell 38 and lip 1172.

Various embodiments of the dessert plate assembly described herein can be used in decorating weddings, all types of parties, home decor, store and restaurant displays. Candle holder can be used as a regular candlestick holder as decorating the home, parties, wedding decor, store displays, etc. After attaching the two items, it then adds personality to anything that is placed on the dessert plate. The candle holder provides style and the height gives it a presence along with the beautiful accompanying plate. Together they can be used on dining tables, buffet displays, entertainment centers, table centerpieces, displaying desserts, bakery shops and restaurants.

In preferred embodiments, the convertible plate has a perimeter shape that is selected from round, oval, square, rectangular, triangular, regular polyhedron, and irregular polyhedron.

In other preferred embodiments, the convertible plate is selected from earthenware, stoneware, porcelain, bone china, glass, melamine, ceramic, steel, stainless steel, iron, copper, aluminum, acrylic, styrene, polypropylene, acrylic blend, polycarbonate, tritan, wood, silicone, metal, and combination thereof.

In one preferred embodiment, the plate and the collar are made from the same material. In another embodiment, the plate and the collar are made from different materials.

Having thus described several illustrative embodiments, it is to be appreciated that various alterations, modifications, and improvements will readily occur to those skilled in the art. Such alterations, modifications, and improvements are intended to be part of this disclosure, and are intended to be within the spirit and scope of this disclosure. While some examples presented herein involve specific combinations of functions or structural elements, it should be understood that those functions and elements may be combined in other ways according to the present invention to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

The invention claimed is:
1. A convertible plate and pedestal candle holder, comprising:
    a plate having a bottom portion, the bottom portion having an inner central pedestal seat area and an outer peripheral rim area, the bottom portion having an outer raised plate footer around the outer peripheral rim area;

an inner pedestal collar on the inner central pedestal seat area of the bottom portion of the plate, said inner pedestal collar encompassed within a circumference of the outer raised plate footer, and wherein said inner pedestal collar and said outer raised plate footer are each raised above a bottom surface of the bottom portion, wherein the outer raised plate footer is lower in height from the bottom surface of the plate than the inner pedestal collar;

the inner pedestal collar comprising a U-shaped configuration having a curved catch portion that connects proximal ends of a first collar arm and a second collar arm, the first and second collar arms defining a receiving aperture opposite the curved catch portion, and each of the first and second collar arms having a flared guide and a biasing element attached to each distal end of the first and second collar arms; and a flange on the inner pedestal collar, the flange defining an interior channel adjacent the bottom surface of the plate;

a pedestal candle holder, said pedestal candle holder comprising a bell portion, a candle holder portion disposed within the bell portion, a shaft portion attached to the bell portion, and a pedestal base attached to a lower end of the shaft portion, said bell portion terminating in a lip portion that circumscribes a terminal end of the bell portion, the lip portion engaging the biasing element of the inner pedestal collar of the plate and tension securing the lip portion within interior channel of the flange against the bottom surface of the plate, said candle holder portion having a bottom end mounted on an inner surface of the bell portion and a top end comprising a candle cavity, wherein detachably mounting the plate on the pedestal candle holder forms a display assembly.

2. The convertible plate of claim 1, wherein the convertible plate has a perimeter shape that is selected from round, oval, square, rectangular, triangular, regular polyhedron, and irregular polyhedron.

3. The convertible plate of claim 1, wherein the plate is selected from earthenware, stoneware, porcelain, bone china, glass, melamine, ceramic, steel, stainless steel, iron, copper, aluminum, acrylic, styrene, polypropylene, acrylic blend, polycarbonate, tritan, wood, silicone, metal, and combination thereof.

4. The convertible plate of claim 3, wherein the plate and the pedestal collar are different materials.

5. A method of converting a plate to a display platter, the steps comprising:

providing the plate and pedestal candle holder of claim 1; and detachably mounting the lip portion into the inner pedestal collar of the plate;

wherein the lip portion is received into the interior channel that is defined by the flange adjacent to the bottom surface of the convertible plate.

6. A method of attaching the plate of claim 1 to the pedestal candle holder of claim 1 to form a display platter, the steps comprising:

(i) providing the plate of claim 1; and (ii) detachably mounting the pedestal candle holder having the lip portion into the inner pedestal collar of the plate;

(iii) engaging the lip portion against the biasing element in the inner pedestal collar to secure the lip portion against the bottom surface of the plate, wherein the lip portion is received into the interior channel that is defined by the flange adjacent to the bottom surface of the plate.

7. The convertible plate and pedestal candle holder of claim 1, wherein the top end of the candle holder portion extends to connect to the bottom surface of the plate.

8. The convertible plate and pedestal candle holder of claim 1, wherein the top end of the candle holder portion is below the bottom surface of the plate.

9. The convertible plate and pedestal candle holder of claim 1, wherein the inner pedestal collar is deformable, said inner pedestal collar having a first position wherein the first and second collar arms are separated by a distance less than a diameter of the lip portion of the pedestal candle holder, and a second position wherein the first and second collar arms are separated by a second distance configured to receive the lip portion of the pedestal candle holder into the receiving aperture, and wherein the pedestal collar is configured to move from the first position to the second position.

* * * * *